UNITED STATES PATENT OFFICE.

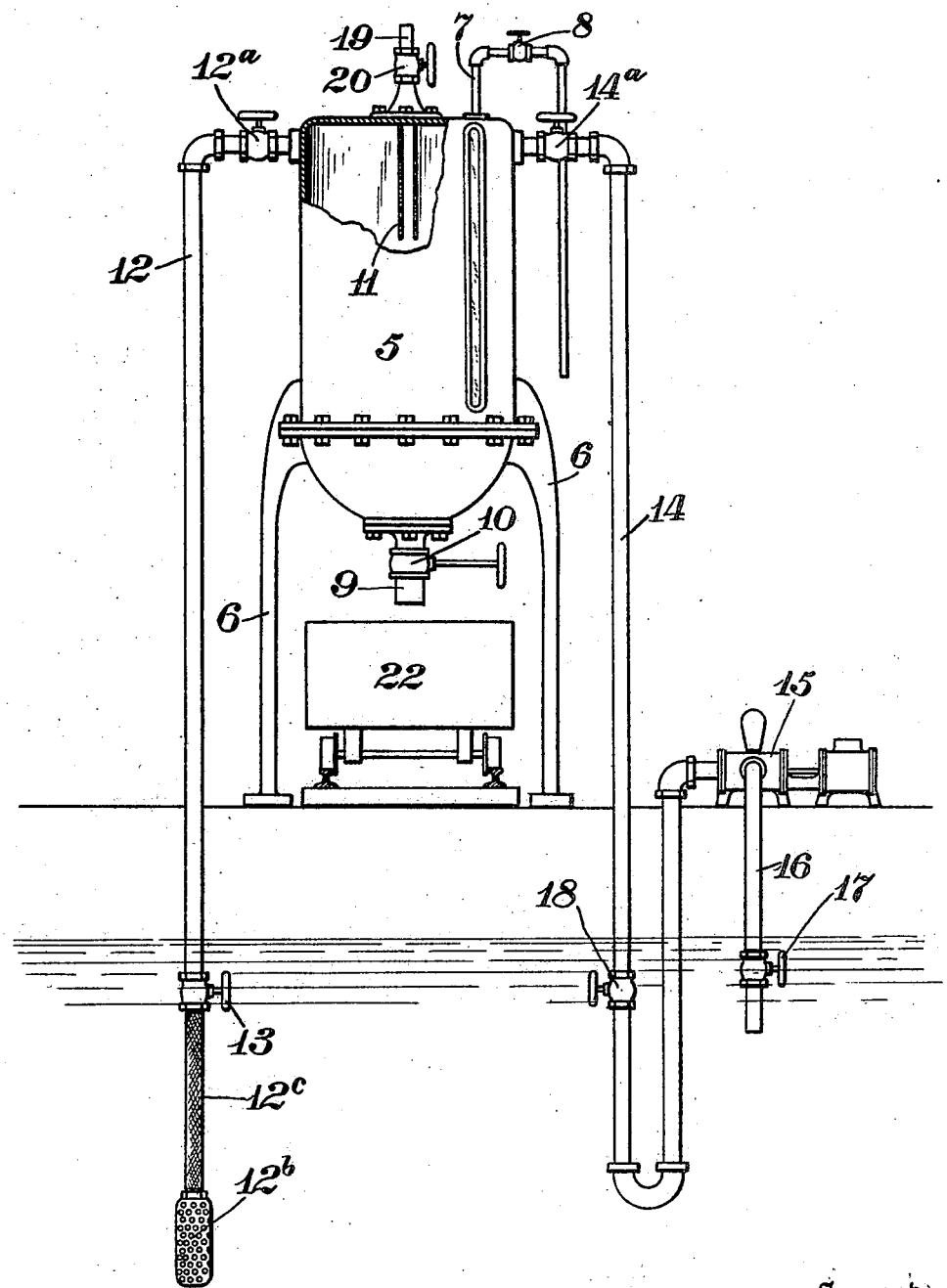

JAMES S. ALSPAUGH, OF PORTSMOUTH, OHIO.

MEANS FOR EXTRACTING SAND FROM THE BOTTOMS OF BODIES OF WATER.

1,402,334.                Specification of Letters Patent.      Patented Jan. 3, 1922.

Application filed December 22, 1920. Serial No. 432,613.

*To all whom it may concern:*

Be it known that I, JAMES S. ALSPAUGH, a citizen of the United States, residing at Portsmouth, in the county of Scioto and State of Ohio, have invented a certain new and useful Improvement in Means for Extracting Sand from the Bottoms of Bodies of Water, of which the following is a specification.

The particular object of this invention is the provision of means whereby sand and other small solids may be economically removed from the bottoms of rivers and other bodies of water and separated from the water during the process of removal.

The invention is embodied in the example of such means herein shown and described, the features of novelty being finally claimed.

In the accompanying drawing the view illustrates mainly in elevation with a portion in section the apparatus installed upon the bank of a river.

In said view 5 designates a tank supported in a position elevated above the ground by legs 6. The upper end of the tank has a water inlet 7 provided with a valve at 8 operable for opening and closing it. The lower end of the tank has a discharge 9 provided with a valve at 10 operable for opening and closing it. The head or upper end of the tank is provided with two finely perforated baffle plates 11 standing parallelly across the upper end of the tank. Connected with the tank at one side of the baffles is a pipe 12 having a flexible extension $12^c$ long enough to reach to the bottom of the river or other body of water whence the sand and gravel are to be withdrawn. The lower end of the extension $12^c$ is provided with a nozzle $12^b$ having perforations limiting the size of the solid particles to be drawn into the pipe. At a point where it will fall below the level of the river pipe 12 or $12^c$ is provided with a valve as at 13 operable to open and close the pipe. Connected with the opposite side of the head of the tank is another pipe 14 extending in loop form down into the water. The upper ends of the pipes 12 and 14 are provided with valves at $12^a$ and $14^a$ respectively operable to open and close those pipes at those ends and where they enter the tank. The other end of pipe 14 at the short upwardly extending leg thereof is connected with the intake of a pump 15 on the bank of the river and the discharge of the pump has connected with it another pipe 16 that extends into the river where it is provided with a valve 17 operable to open and close the same. A similar valve can be put into the long leg of the pipe 14 as shown at 18. This valve is normally left open. The tank is also provided at its top with an air vent 19 having a valve at 20 operable to open and close the same.

In practice the valves $12^a$ and $14^a$ are first opened and the valves 13 and 17 closed. The tank and the pipes are then filled through pipe 7 with water from, for example the city or town supply. The valves 8 and 20 are then closed and the valves 13 and 17 opened and the operation of the pump begun. The operation of the pump draws water, sand and gravel up through pipe 12 and such sand and gravel, being intercepted by the baffles, drop into the tank, the water passing to the pipe 14, pump 15 and pipe 16 back to the river. Corresponding columns of water in the pipes 14 and 16 balance each other so that by reason of the siphonic effect the power required to draw the water and its load of solids up the pipe 12 is thereby somewhat reduced.

A transparent glass at 21 in the wall of the tank makes visible the extent of the accumulation of sand in the tank.

When it is desired to discharge the tank the valves $12^a$ or 13 in the pipe 12 and the valve $14^a$, 17 or 18 closed and the valves 10 and 12 opened. The valve 10, of course, permits the discharge of the accumulated sand while the vent 19 permits the ingress of air when the sand is discharged. The sand may be discharged into a car 22 run under the discharge nozzle 9. To repeat the operation the valve 10 is again closed and the tank refilled with water through pipe 7 as before, the vent 19 being left open until the tank is refilled after which the operation may be repeated upon closing the vent and reopening of such of the valves $12^a$, 13, $14^a$, 17 and 18 as may have been closed to discharge the tank. In other words a repetition of the operation after a discharge of the tank only requires the refilling of the tank with water.

The provision of the loop in the pipe 14 prevents leakage of air past the pump and the breaking of the siphon at the top of the tank. Where the bank is high the siphonic effect can be augmented by locating the pump down close to the water level, thereby lengthening the corresponding columns of water.

The forms of the parts can be changed without departing from the gist of the invention as claimed.

What I claim is:

1. Means for extracting solids from the bottoms of bodies of water, comprising, in combination, an elevated tank, means whereby the same may be filled with water and discharged of solids, two pipes leading from the tank, one for the passage of solids and water to the tank and the other a siphonic pipe provided with a pump to aid siphonic action in drawing water and solids up the first mentioned pipe.

2. Means for extracting solids from the bottoms of bodies of water, comprising, in combination, an elevated tank, means whereby the same may be filled with water and discharged of solids, two pipes leading from the tank, one for the passage of solids and water to the tank and the other a siphonic pipe provided with a pump to aid siphonic action in drawing water and solids up the first mentioned pipe and a baffle in said tank to prevent the flow of solids from one pipe to the other.

3. Means for extracting solids from the bottoms of bodies of water, comprising, in combination, an elevated tank, means whereby the same may be filled with water and discharged of solids, two pipes leading from the tank, one for the passage of solids and water to the tank and the other a siphonic pipe provided with a pump to aid siphonic action in drawing water and solids up the first mentioned pipe and valves in said pipes for preventing the escape of water from said pipes when the tank is refilled with water after the discharge of the accumulated solids therein.

JAMES S. ALSPAUGH.